Nov. 10, 1925.
W. M. WILKIE ET AL
ATTACHMENT FOR CARBURETORS
Filed Feb. 7, 1924
1,561,131
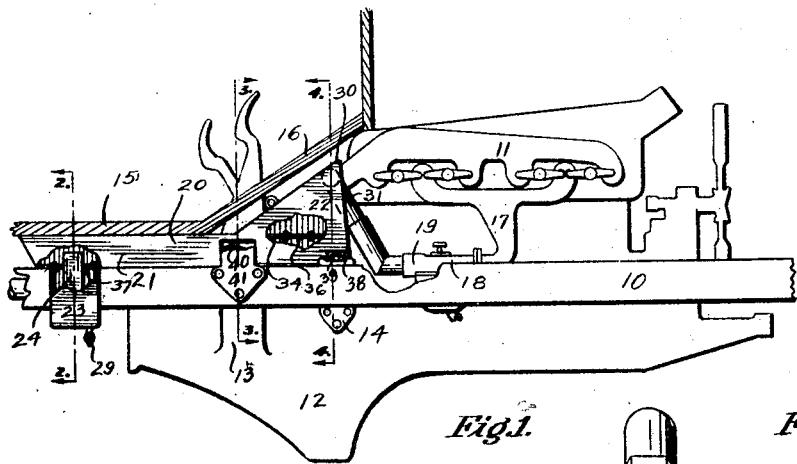
Fig.1.
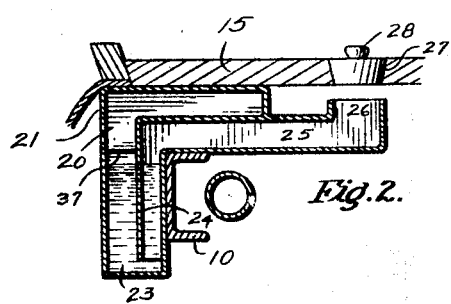
Fig.2.
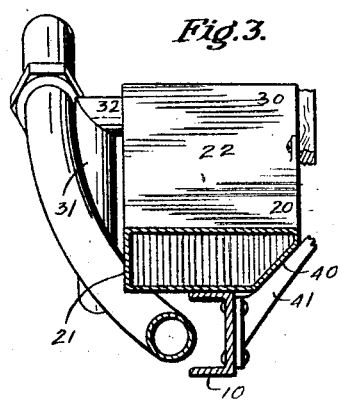
Fig.3.
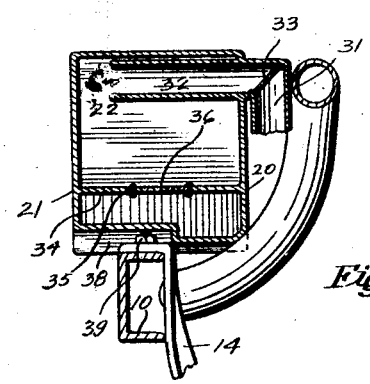
Fig.4.

Patented Nov. 10, 1925.

1,561,131

UNITED STATES PATENT OFFICE.

WILTON M. WILKIE AND WILLIAM WESTEDT, OF NEW HAMPTON, IOWA.

ATTACHMENT FOR CARBURETORS.

Application filed February 7, 1924. Serial No. 691,324.

*To all whom it may concern:*

Be it known that we, WILTON M. WILKIE and WILLIAM WESTEDT, citizens of the United States, and residents of New Hampton, in the county of Chickasaw and State of Iowa, have invented a certain new and useful Attachment for Carburetors, of which the following is a specification.

This invention relates to improvements in attachments for carburetors for the purpose of washing air before it is delivered to the carburetor and for humidifying and washing the air before it reaches the carburetor.

More specifically it is the object of our invention to provide a device in the nature of an attachment which may be placed on the frame of an automobile beneath the floor boards and adjacent to the exhaust pipe, so as to receive a portion of the heat therefrom, and designed to carry a body of water through which the air has to travel, first for the purpose of washing any foreign dirt or substance therefrom, and further for humidifying the air so as to make more complete combustion in the engine cylinders. The device is so constructed and arranged that all of the moisture or water will be separated from the air.

Our invention consists in the construction, arrangement and combination of the various parts of the device, whereby the objects contemplated are attained, as hereinafter more fully set forth, pointed out in our claims, and illustrated in the accompanying drawings, in which:

Figure 1 is a side elevation of an automobile engine showing the floor board and a portion of the dash in section and illustrating the manner in which our improved attachment is secured thereon.

Figure 2 is a detail sectional view taken on the line 2—2 of Figure 1.

Figure 3 is a detail transverse sectional view taken on the line 3—3 of Figure 1.

Figure 4 is a detail transverse sectional view taken on the line 4—4 of Figure 1.

The numeral 10 indicates the frame of an automobile and 11 the engine, and 12 the engine base, the engine being supported on the frame by means of brackets 13 and 14. Above the frame 10 is the floor 15 and the foot board 16, considerable space being provided between the floor 15 and the frame 10. The engine is provided with an intake manifold 17 having at its lower end a carburetor 18, which is of the usual construction, the carburetor being provided with an intake member 19.

Our improved device comprises a tank 20 formed preferably of sheet metal and comprising substantially a rectangular portion 21 having at one end an enlarged portion 22. A transverse section of the portion 21 is best shown in Figure 3. The portion 21 is designed to rest on top of the frame member 10 and beneath the floor board 15, and has at its rear end a washing tank 23 designed to extend downwardly and rest adjacent to the outer face of the frame member 10. The tank 23 is provided with a tube 24 which extends upwardly thence transversely across the chamber of the member 21 and has a portion 25 extending inwardly from the inner face of the tank member 21.

The inwardly extending portion 25 is provided with an upwardly extending portion 26 through which the tank 23 may be filled, the filling taking place through an opening 27 in the floor board 15, said opening being provided with a stopper 28. The bottom end of the tank 23 is provided with a pet cock 29 by which the tank may be drained if any water or dirt should collect therein.

The member 21 is mounted horizontally beneath the floor board and has a chamber of comparatively large area which communicates with the chamber of the enlarged portion 22, said enlarged portion being provided with an inclined top 30 to fit the foot board 16. The intake pipe 31 is connected to the upper end of the portion 22 which extends downwardly and forwardly and makes connection with the intake 19 of the carburetor. The pipe 31 is formed of two members, one telescopically received in the other.

The upper end of the pipe 31 has inwardly extending portion 32, a screen 33 being provided between the pipes 31 and 32. A horizontally arranged partition 34 is arranged in the enlarged portion substantially in line with the top of the member 21. The said partition 34 is provided with an opening 35 in which is mounted a screen 36.

The members 20 and 22 overhang the frame both inwardly and outwardly. The inwardly overhanging portion is mounted above an exhaust pipe 36ª which extends toward and beneath the tank, which in turn slightly warms the incoming air. A screen 37 is provided in the top end of the tank 23.

The inner forward edge of the member 22 is provided with a notch 38 designed to rest over the bolt 39 which supports the bracket 14, while the members 22 and 21 are provided with a notch 40 to set over a brace 41 of the main frame. The notches 39 and 40 serve to assist in keeping the tank in position above the frame 10 against both rearward and horizontal movement. The downwardly extending tank 23 serves to hold the rear end of the tank 21 against inward movement, while the said tank is held against outward movement by the brace 41 and the bracket 14.

The operation of our device is as follows:

The device is first filled with water by removing the plug 28 from the opening 27, then pouring water into the opening 26 until it has reached a position below the screen 37 and below the bottom of the tank 21. This leaves the lower end of the tube 24 entirely submerged. The pipe 31 is then connected with the member 19. It will then be seen that if the engine is operated, air will be pulled through the opening 26, the pipe 25 and the downwardly extending portion 24, and will bubble up through the water within the chamber 23, thoroughly washing the air. The screen 37 serves to assist in separating the water from the air, the air passing through the said pipe at a comparatively high velocity. It is then drawn into the member 21 which is of comparatively large area or volume, and in which the speed of the air is proportionately reduced, giving the heavier drops of water time to settle on the bottom of the tank. The air then travels up through the screen 36 and further separation is accomplished, and from there to the compartment 22 and from the compartment 22 to the inlet pipe 40 32 through the screen 33 and to the carburetor 18 through the pipe 31.

By this arrangement we have provided means whereby the air will be thoroughly washed and humidified before reaching the carburetor, which will result in the pistons and cylinders of the engine lasting a great deal longer, due to the fact that no dirt enters the same and they will keep clean and free from carbon due to the fact that a certain amount of moisture in the air assists in burning out the carbon and also making a more even and uniform power.

We claim as our invention:

An attachment for carburetors comprising a main body portion formed rectangular in cross section having an enlarged portion at one end and a downwardly extending tank at its opposite end, a tube extending from the exterior of said body portion to the bottom of said tank and terminating near the bottom thereof, a screen at the upper end of said tank, a screen between the main body portion and the enlarged body portion, a pipe leading from the upper portion of the enlarged body portion and adapted to be attached to the intake of a carburetor.

Des Moines, Iowa, December 12, 1923.

WILTON M. WILKIE.
WILLIAM WESTEDT.